(12) United States Patent
Hosokawa et al.

(10) Patent No.: US 9,036,904 B2
(45) Date of Patent: May 19, 2015

(54) IMAGE PROCESSING DEVICE AND METHOD, LEARNING DEVICE AND METHOD, AND PROGRAM

(71) Applicant: Sony Corporation, Tokyo (JP)

(72) Inventors: Kenichiro Hosokawa, Kanagawa (JP); Takahiro Nagano, Kanagawa (JP); Shintaro Okada, Tokyo (JP); Yiwen Zhu, Kanagawa (JP); Kazunori Kamio, Kanagawa (JP)

(73) Assignee: Sony Corporation (JP)

( * ) Notice: Subject to any disclaimer, the term of this patent is extended or adjusted under 35 U.S.C. 154(b) by 110 days.

(21) Appl. No.: 13/891,514

(22) Filed: May 10, 2013

(65) Prior Publication Data

US 2013/0308854 A1 Nov. 21, 2013

(30) Foreign Application Priority Data

May 17, 2012 (JP) .................................. 2012-113275

(51) Int. Cl.
*G06K 9/62* (2006.01)
*G06T 5/20* (2006.01)
*G06T 5/50* (2006.01)

(52) U.S. Cl.
CPC ............... *G06K 9/6256* (2013.01); *G06T 5/20* (2013.01); *G06T 5/50* (2013.01); *G06T 2207/20081* (2013.01); *G06T 2207/20192* (2013.01)

(58) Field of Classification Search
CPC ............................................ G06T 2207/20081
USPC ......... 382/159, 255, 224; 348/208.4; 345/618
See application file for complete search history.

(56) References Cited

U.S. PATENT DOCUMENTS 8,315,473 B1 * 11/2012 Tao et al. .................... 382/260
2004/0062450 A1 * 4/2004 Kondo et al. ............... 382/266

FOREIGN PATENT DOCUMENTS

JP 2007251689 A 9/2007

\* cited by examiner

*Primary Examiner* — Mike Rahmjoo
(74) *Attorney, Agent, or Firm* — Lerner, David, Littenberg, Krumholz & Mentlik, LLP

(57) ABSTRACT

There is provided an image processing device including a weight calculation unit that calculates a weight corresponding to each of a plurality of pixel values centering on a pixel of interest of an input image based on a feature amount calculated based on the plurality of pixel values centering on the pixel of interest, a regression coefficient reading unit that reads a regression coefficient stored for each class code determined based on a plurality of pixel values corresponding to the pixel of interest of the input image, and a pixel value calculation unit that calculates a pixel value of a pixel of interest of an output image by performing calculation using the plurality of pixel values, the weights, and the regression coefficients centering on the pixel of interest of the input image.

6 Claims, 7 Drawing Sheets

IMAGE PROCESSING DEVICE AND METHOD, LEARNING DEVICE AND METHOD, AND PROGRAM

CROSS-REFERENCE TO RELATED APPLICATION

The present application claims priority from Japanese Patent Application No. JP 2012-113275 filed in the Japanese Patent Office on May 17, 2012, the entire content of which is incorporated herein by reference.

BACKGROUND

The present technology relates to an image processing device and method, a learning device and method, and a program, and more particularly, to an image processing device and method, a learning device and method, and a program capable of performing an image quality improvement process on various images including an edge or a texture without occurrence of deterioration.

In the past, in digital image data, sharpness processing has been performed to emphasize the contour or the like of an image. By heightening a difference (contrast) between gray scales of a contour portion through the sharpness processing, the sense of sharpness of an appearance can be intensified.

However, when the sharpness processing is uniformly performed even on any image, image quality may actually deteriorate. For example, when the sharpness processing is performed on an artificial image such as a character or a simple figure, a portion in which an edge is originally sufficiently cleared through appropriate sharpness processing performed on a natural image may be overemphasized, and thus deterioration such as ringing may occur in some cases.

That is, when sharpness of a texture portion in an image is attempted to be improved through the sharpness processing, the deterioration such as ringing may be conspicuous in an edge portion in the image. On the other hand, when the process of suppressing the ringing on the edge portion in the image is performed, the sharpness of the texture portion in the image may be weakened.

Accordingly, the applicants have suggested a method of enabling an improvement in the sharpness of an edge and an improvement in the sharpness of a texture to be compatible (for example, see Japanese Unexamined Patent Application Publication No. 2007-251689).

According to Japanese Unexamined Patent Application Publication No. 2007-251689, for example, use of a dedicated edge process and a dedicated texture process is sorted depending on a feature amount of each region in an image.

SUMMARY

In the technology of Japanese Unexamined Patent Application Publication No. 2007-251689, however, for example, a boundary between the dedicated edge process and the dedicated texture process may become prominent.

As in Japanese Unexamined Patent Application Publication No. 2007-251689, for example, when the use of the dedicated edge process and the dedicated texture process is sorted, it is necessary to implement two dedicated processes and implement a determination process of sorting the use of the two dedicated processes. Therefore, there is a problem that the scale of the processes may easily increase and high cost may be easily caused.

Further, it is difficult to determine an edge portion and a texture portion in some cases. Therefore, when the process of improving the sharpness adaptively according to the image qualities of various input images is performed, there is a limit to suppression of the ringing at the time of an attempt of considerable improvement in the sharpness.

It is desirable to provide a technology capable of performing an image quality improvement process on various images including an edge or a texture without occurrence of deterioration.

According to a first embodiment of the present technology, there is provided an image processing device including a weight calculation unit that calculates a weight corresponding to each of a plurality of pixel values centering on a pixel of interest of an input image based on a feature amount calculated based on the plurality of pixel values centering on the pixel of interest, a regression coefficient reading unit that reads a regression coefficient stored for each class code determined based on a plurality of pixel values corresponding to the pixel of interest of the input image, and a pixel value calculation unit that calculates a pixel value of a pixel of interest of an output image by performing calculation using the plurality of pixel values, the weights, and the regression coefficients centering on the pixel of interest of the input image.

The weight calculation unit may calculate a feature amount having high correlation with presence of an edge based on the pixel values belonging to a group.

The image processing device may further include a group sorting unit that sorts the plurality of pixel values centering on the pixel of interest of the input image into a plurality of groups. The weight calculation unit calculates a weight corresponding to each of the plurality of pixel values centering on the pixel of interest, based on the feature amount calculated for each group based on the pixel values belonging to the group.

The weight calculation unit may sort a first number of pixel values centering on the pixel of interest into a plurality of groups which are constituted by pixels at a plurality of positions including at least a pixel position of the pixel of interest and are constituted by a second number of pixel values, the second number being smaller than the first number.

The regression coefficient may be learned and stored in advance. In the learning, a high-quality image may be set as a teacher image and an image obtained by deteriorating the teacher image is set as a student image. A plurality of samples of a linear equation used to calculate a pixel value of a pixel of interest of the teacher image using a pixel value of the student image and the weights may be generated for each class code, and the optimum regression coefficient is calculated from the plurality of samples.

According to the first embodiment of the present technology, there is provided an image processing method including calculating, by a weight calculation unit, a weight corresponding to each of a plurality of pixel values centering on a pixel of interest of an input image based on a feature amount calculated based on the plurality of pixel values centering on the pixel of interest, reading, by a regression coefficient reading unit, a regression coefficient stored for each class code determined based on a plurality of pixel values corresponding to the pixel of interest of the input image, and calculating, by a pixel value calculation unit, a pixel value of a pixel of interest of an output image through calculation of a linear equation using the plurality of pixel values, the weights, and the regression coefficients centering on the pixel of interest of the input image.

According to the first embodiment of the present technology, there is provided a program for causing a computer to function as an image processing device including a weight calculation unit that calculates a weight corresponding to each of a plurality of pixel values centering on a pixel of interest of an input image based on a feature amount calculated based on the plurality of pixel values centering on the pixel of interest, a regression coefficient reading unit that reads a regression coefficient stored for each class code determined based on a plurality of pixel values corresponding to the pixel of interest of the input image, and a pixel value calculation unit that calculates a pixel value of a pixel of interest of an output image by performing calculation using the plurality of pixel values, the weights, and the regression coefficients centering on the pixel of interest of the input image.

According to the first embodiment of the present technology, a weight corresponding to each of a plurality of pixel values centering on a pixel of interest of an input image based on a feature amount calculated based on the plurality of pixel values centering on the pixel of interest may be calculated, a regression coefficient stored for each class code determined based on a plurality of pixel values corresponding to the pixel of interest of the input image is read, and a pixel value of a pixel of interest of an output image by performing calculation using the plurality of pixel values, the weights, and the regression coefficients centering on the pixel of interest of the input image may be calculated.

According to a second embodiment of the present technology, there is provided a learning device that sets a high-quality image as a teacher image and sets an image obtained by deteriorating the teacher image as a student image, the device including a weight calculation unit that calculates a weight corresponding to each of a plurality of pixel values of the student image based on a feature amount calculated based on the plurality of pixel values of the student image corresponding to a pixel of interest of the teacher image, and a regression coefficient calculation unit that calculates a regression coefficient of regression prediction calculation performed to calculate a pixel value of the pixel of interest of the teacher image through calculation of a linear equation using the plurality of pixel values, the weights, and the regression coefficients of the student image.

The weight calculation unit may calculate a feature amount having high correlation with presence of an edge based on the pixel values belonging to a group.

The learning device may further include a group sorting unit that sorts the plurality of pixel values of the student image corresponding to the pixel of interest of the teacher image into a plurality of groups. The weight calculation unit may calculate a weight corresponding to each of the plurality of pixel values of the student image, based on a feature amount calculated for each group based on the pixel values belonging to the group.

The weight calculation unit may sort a first number of pixel values centering on the pixel of interest into a plurality of groups which are constituted by pixels at a plurality of positions including at least a pixel position of the pixel of interest and are constituted by a second number of pixel values, the second number being smaller than the first number.

According to the second embodiment of the present technology, there is a learning method that sets a high-quality image as a teacher image and sets an image obtained by deteriorating the teacher image as a student image, the method including calculating, by a weight calculation unit, a weight corresponding to each of a plurality of pixel values of the student image based on a feature amount calculated based on the plurality of pixel values of the student image corresponding to a pixel of interest of the teacher image, and calculating, by a regression coefficient calculation unit, a regression coefficient of regression prediction calculation performed to calculate a pixel value of the pixel of interest of the teacher image through calculation of a linear equation using the plurality of pixel values, the weights, and the regression coefficients of the student image.

There is provided a program causing a computer to function as a learning device that sets a high-quality image as a teacher image and sets an image obtained by deteriorating the teacher image as a student image, the learning device including a weight calculation unit that calculates a weight corresponding to each of a plurality of pixel values of the student image based on a feature amount calculated based on the plurality of pixel values of the student image corresponding to a pixel of interest of the teacher image, and a regression coefficient calculation unit that calculates a regression coefficient of regression prediction calculation performed to calculate a pixel value of the pixel of interest of the teacher image through calculation of a linear equation using the plurality of pixel values, the weights, and the regression coefficients of the student image.

According to the second embodiment of the present technology, a learning device sets a high-quality image as a teacher image and sets an image obtained by deteriorating the teacher image as a student image, a weight corresponding to each of a plurality of pixel values of the student image based on a feature amount calculated based on the plurality of pixel values of the student image corresponding to a pixel of interest of the teacher image may be calculated, and a regression coefficient of regression prediction calculation performed to calculate a pixel value of the pixel of interest of the teacher image through calculation of a linear equation using the plurality of pixel values, the weights, and the regression coefficients of the student image may be calculated.

According to the embodiments of the present technology, it is possible to perform the image quality improvement process on various images including an edge or a texture without occurrence of deterioration.

DETAILED DESCRIPTION OF THE EMBODIMENTS

Figure 1:
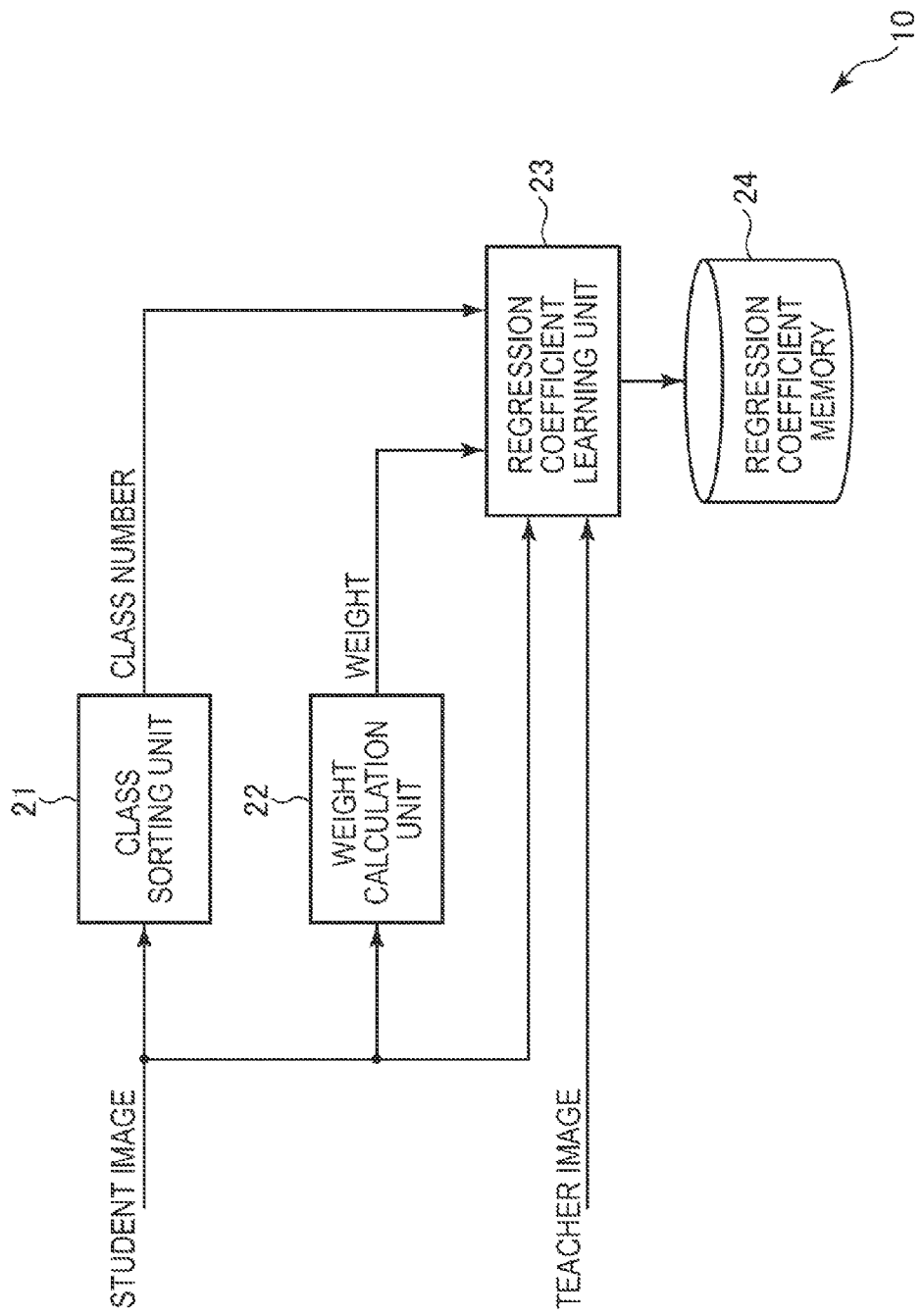
FIG. 1 is a block diagram illustrating an example of the configuration of a learning device according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment of the technology disclosed here will be described with reference to the drawings.

FIG. 1 is a block diagram illustrating an example of the configuration of a learning device according to an embodiment of the present technology.

A learning device 10 is configured as a learning device that is used for an image quality improvement process on an image and generates a regression coefficient used for the image quality improvement process based on data of an input student image and an input teacher image (or a teacher signal). Here, the image quality improvement process is, for example, a process of improving sharpness of an image or a process of removing noise of an image.

The learning device 10 is configured to learn regression coefficients which are coefficients used to generate a high-quality image close to the teacher image as an output image by receiving the student image as an input image. As will be described in detail, for example, the regression coefficients are coefficients that are used for regression prediction calculation of a linear equation used to calculate a prediction value of a pixel of interest in a quality-improved image by setting feature amounts obtained from the values of a plurality of pixels corresponding to a pixel of interest in an input image as parameters.

The regression coefficient is learned for each class code to be described below and the regression coefficient is learned in consideration of a weight to be described below.

The learning device 10 sorts a plurality of pixel values corresponding to a pixel of interest of an input image into one of a plurality of classes based on the plurality of pixel values corresponding to the pixel of interest and the feature amounts obtained from the pixel values. Further, the learning device 10 calculates weights by which the pixel values are to be multiplied based on the plurality of pixel values corresponding to the pixel of interest of the input image and the feature amounts obtainable from the pixel values.

That is, in the image quality improvement process, the pixel of interest is sorted into a class based on the plurality of pixel values corresponding to the pixel of interest of the input image and the feature amounts obtained from the pixel values. Then, by performing calculation of the linear equation using the regression coefficient of each class learned by the learning device 10, the above-described weights, and the plurality of pixel values corresponding to the pixel of interest of the input image, the pixel values of the quality-improved image are calculated.

The learning device 10 shown in FIG. 1 includes a class sorting unit 21, a weight calculation unit 22, a regression coefficient learning unit 23, and a regression coefficient memory 24.

In the learning device 10, for example, an image with no noise is input as a teacher image and an image deteriorated in image quality by adding noise to the teacher image is input as a student image. For example, an image obtained by adding various kinds of noise to the teacher image, an image obtained by adding a burr to the teacher image, an image obtained by shifting a pixel position in the teacher image, an image obtained by thinning out a pixel in the teacher image, or the like is input as the student image.

The class sorting unit 21 extracts a class tap constituted by a plurality of pixel values of the student image corresponding to a pixel of interest of the teacher image and sorts the class tap into a class based on a feature amount of the extracted class tap.

Figure 2:
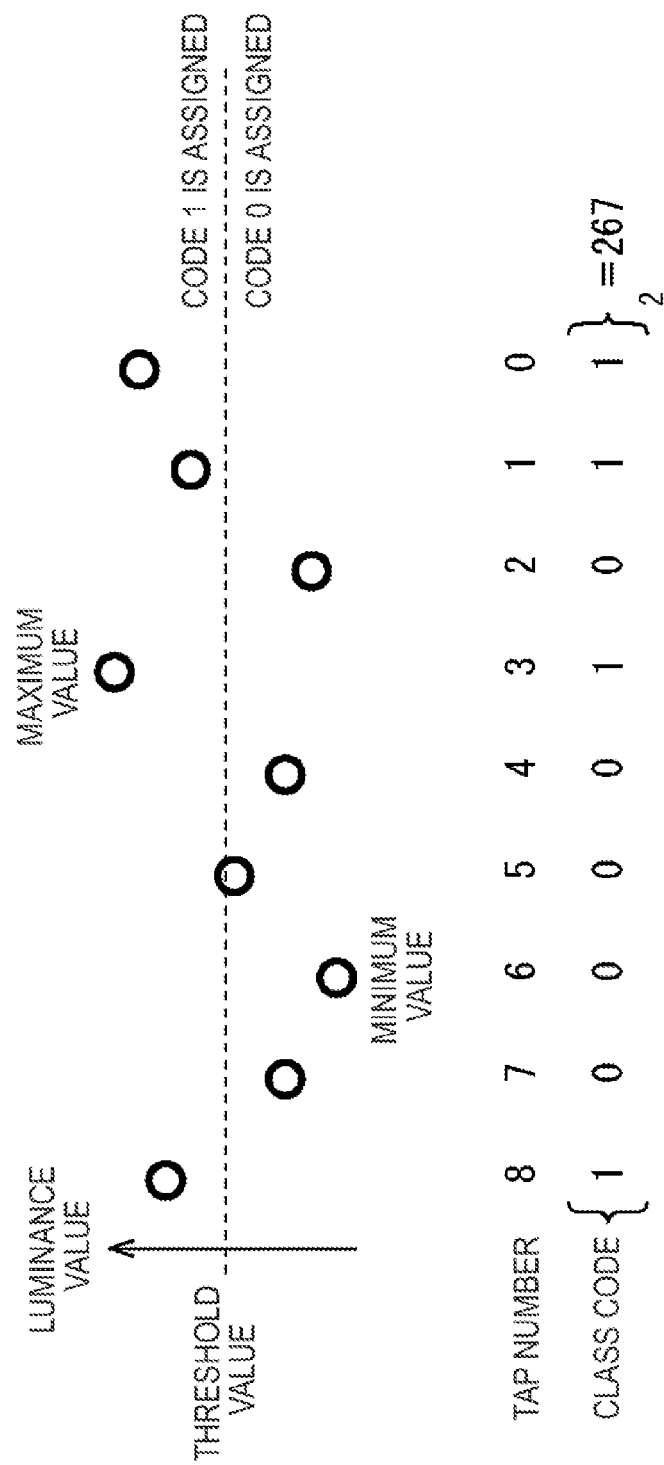
FIG. 2 is a diagram illustrating an example of a class code specifying method.

FIG. 2 is a diagram illustrating an example of a class sorting method. In this example, 9 pixel values corresponding to a pixel of interest of the input image and peripheral pixels of the pixel of interest are acquired as class taps. Further, identification numbers (tap numbers) 0 to 8 are affixed in a preset order of the 9 pixel values.

Threshold values are determined for the pixel values of the tap numbers 0 to 8 and code 1 or 0 is assigned based on the determination result of the threshold values. In this example, when the pixel value (luminance value) is greater than the threshold value, code 1 is assigned. When the pixel value (luminance value) is less than the threshold value, code 0 is assigned.

Digits of binary numbers obtained by arranging the assigned codes of the tap numbers 0 to 8 are set as class codes. In this example, 100001011 (267 in decimal) are set as the class codes. Thus, the class tap is sorted into the class corresponding to the class codes 267. Further, the class may be sorted in more detail using a difference or the like between the maximum and minimum values of the pixel values.

Specifying the class code shown in FIG. 2 is called 1 bit Adaptive Dynamic Range Coding (ADRC). Of course, the class sorting unit 21 may specify the class code according to a method other than the 1 bit ADRC.

Referring back to FIG. 1, the weight calculation unit 22 extracts a prediction tap from the plurality of pixel values of the student image corresponding to the pixel of interest of the teacher image and calculates a weight corresponding to each pixel value in the prediction tap. The weight calculation unit 22 sorts the pixel values constituting the prediction tap into a plurality of groups and calculates a weight for each group based on feature amounts obtained from the pixel values belonging to each group. When ti is assumed to be the value of the pixel of interest of the teacher image, a plurality of pixel values xij of the student image corresponding to the pixel of interest of the teacher image are extracted as the prediction tap.

Figure 3:
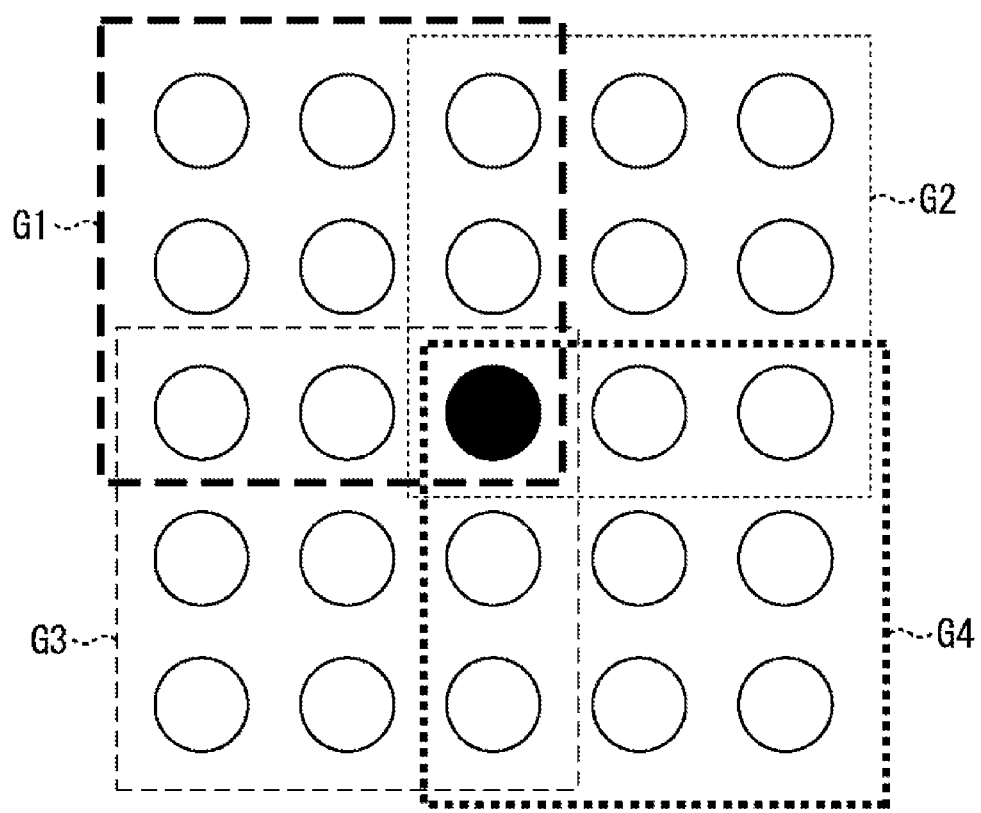
FIG. 3 is a diagram illustrating an example of grouping of class taps.

FIG. 3 is a diagram illustrating grouping of the prediction taps. In the drawing, 25 (=5×5) circles are illustrated and each circuit indicates a pixel. The black circle in the middle of the drawing indicates a pixel of interest. That is, in the example of FIG. 3, the pixel values of 25 pixels centering on the pixel of interest are set as a prediction tap.

In the example of FIG. 3, the pixel values constituting the prediction tap are sorted into four groups, groups G1 to G4. The group G1 is set as a group which is constituted by the pixel values of 9 pixels and in which the pixel of interest is disposed on the lower right side. The group G2 is set as a group which is constituted by the pixel values of 9 pixels and in which the pixel of interest is disposed on the lower left side. The group G3 is set as a group which is constituted by the pixel values of 9 pixels and in which the pixel of interest is disposed on the upper right side. The group G4 is set as a group which is constituted by the pixel values of 9 pixels and in which the pixel of interest is disposed on the upper left side.

The weight calculation unit 22 calculates feature amounts having high correlation with presence of an edge based on the respective pixel values belonging to the groups G1 to G4. For example, feature amounts such as dynamic ranges or activities are calculated as the feature amounts having the high correlation with the presence of the edge.

The weight calculation unit 22 specifies the maximum and minimum values of the feature amounts calculated for the groups G1 to G4, as described above, and calculates the weight set for each group. For example, a weight vg corresponding to a group Gg can be obtained as follows.

$$Vg = f\left(\max_{1 \leq m \leq 4} param_m + \min param_n - param_g\right) \quad (1)$$

In Expression (1), maxparam and miniparam indicate the maximum and minimum values of the feature amounts calculated for the groups G1 to G4. In Expression (1), the function f(x) is a function for adjusting a weight applying method. For example, a function such as Expression (2), Expression (3), or the like is used.

$$f(x)=1/(1+\exp(-x)) \quad (2)$$

$$f(x)=x^n \quad (3)$$

A total sum of the weights by which the pixels in the prediction tap are multiplied is normalized to be 1.0. That is, when L is assumed to be the total number of the pixel values of the prediction tap, the weight vij by which each (for example, 25) of the pixel values in the prediction tap is multiplied is calculated so that Expression (4) can be satisfied. Since the pixels at some positions near the pixel of interest in the prediction tap repeatedly belong to the plurality of groups, the values of these pixels are multiplied by the weight a plurality of times.

$$\sum_{j=1}^{L} V_{ij} = 1.0 \quad (4)$$

In Expression (4), suffix j indicates the identification number (tap number) of a pixel in the prediction tap.

The example shown in FIG. 3 is an example of the grouping and the grouping may not necessarily be performed in this way. For example, the pixels arrayed in one line may be grouped. As the feature amounts having the high correlation with the presence of an edge, different feature amounts may be calculated for the individual groups. For example, the feature amounts may be calculated such that a dynamic range is calculated for the group G1, an activity is calculated for the group G2, and the like.

Referring back to FIG. 1, the regression coefficient learning unit 23 learns the regression coefficient using the weights vij obtained as described above. That is, the pixel of interest in the pixels constituting the teacher image are sequentially set and the weight vij is calculated in correspondence with each pixel of interest. Then, samples of a linear equation used to calculate the pixel values of the teacher image based on the pixel values of the student image are sequentially generated. The sample of the linear equation generated as described above is added for each class code.

For example, when wcj is assumed to be a regression coefficient corresponding to a class code c, the regression coefficient wcj may be obtained by the least-square method based on the samples of the linear equation added in the above-described way so that a minimization function Q calculated by Expression (5) is the minimum. Thus, the optimum regression coefficient wcj can be calculated when used in calculation of Expression (6) to be described below.

$$Q = \sum_{i=1}^{N} \left\{ t_i - \sum_{j=1}^{L} V_{ij} W_{cj} X_{ij} \right\}^2 \quad (5)$$

The regression coefficient wcj obtained in this way is stored in the regression coefficient memory 24 in correspondence with the class code. Thus, the regress coefficient is learned.

Figure 4:
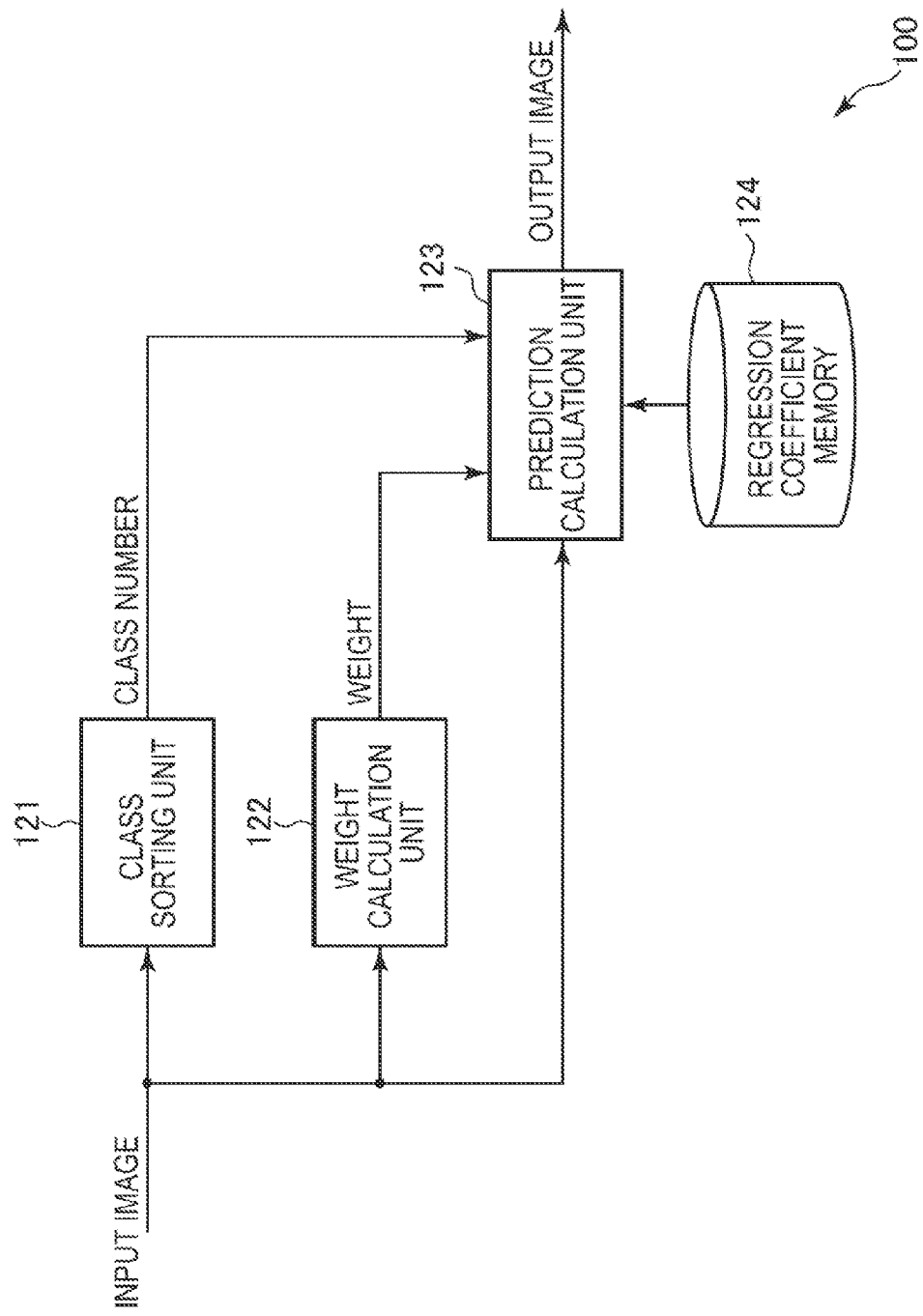
FIG. 4 is a block diagram illustrating an example of the configuration of an image processing device according to an embodiment of the present technology.

FIG. 4 is a block diagram illustrating an example of the configuration of an image processing device according to an embodiment of the present technology. An image processing device 100 in the drawing is an image processing device corresponding to the learning device 10 in FIG. 1. That is, the image processing device 100 performs regression prediction calculation of the prediction tap obtained from an input image using the regression coefficients learned by the learning device 10 and performs image processing to improve the quality of the input image.

The image processing device 100 shown in FIG. 4 includes a class sorting unit 121, a weight calculation unit 122, a prediction calculation unit 123, and a regression coefficient memory 124.

The regression coefficients stored in the regression coefficient memory 24 of the learning device 10 are stored in advance in the regression coefficient memory 124 of the image processing device 100.

The class sorting unit 121 extracts the class tap constituted by the plurality of pixel values corresponding to the pixel of interest of the input image and sorts the class tap into a class based on the feature amounts of the extracted class tap. The class sorting performed by the class sorting unit 121 of the image processing device 100 is performed according to the same method as that of the class sorting unit 21 of the learning device 10. For example, as described above with reference to FIG. 2, the classes are sorted and the class code corresponding to the extracted class tap is specified.

The weight calculation unit 122 extracts the prediction tap constituted by the plurality of pixel values corresponding to the pixel of interest of the input image and calculates a weight corresponding to each pixel value in the prediction tap. As described above with reference to FIG. 3, as in the weight calculation unit 22 of the learning device 10, for example, the weight calculation unit 122 of the image processing device 100 sorts the pixel values constituting the prediction tap into a plurality of groups. Then, the weight calculation unit 122 calculates a weight for each group based on the feature amount obtained from the pixel values belonging to each group.

The feature amounts are set as feature amounts having high correlation with presence of an edge. For example, feature amounts such as dynamic ranges or activities are calculated as the feature amounts having the high correlation with the presence of the edge.

As described above, a weight vij by which each of the pixel values in the prediction tap is multiplied is calculated.

The prediction calculation unit 123 reads the regression coefficient wcj corresponding to the class code c specified by the class sorting unit 121 from the regression coefficient memory 124.

The prediction calculation unit 123 multiplies the pixel values constituting the prediction tap by the weights vij calculated by the weight calculation unit 122 and multiplies the pixel values constituting the prediction tap by the regression coefficient wcj read from the regression coefficient memory 124. That is, when i is assumed to be the identification number of the pixel of interest, a prediction value yi of the pixel of interest generated from the input image is obtained by the linear equation expressed by Expression (6).

$$y_i = \sum_{j=1}^{L} V_{ij} W_{cj} X_{ij} \quad (6)$$

By repeating the calculation of Expression (6), the pixel value of each of the pixels constituting an output image is calculated.

The image processing device 100 outputs the output image generated as described above.

According to the embodiment of the present technology, as described above, the pixel values constituting the prediction tap are sorted in more detail into groups and weights are calculated. Accordingly, an importance of an individual pixel in a reference region of the input image used to generate the pixels of the output image is adaptively set by a local feature amount. Specifically, the weights of the pixel values constituting the prediction tap are switched according to the feature amount of each group.

In the embodiment of the present technology, the pixel values of the output image are calculated by applying the statistically optimized coefficients in addition to the setting of the weights for each class.

In the embodiment of the present technology, the importance of the individual pixel in the reference region of the input image is set based on the feature amount having the high correlation with the presence of an edge. Accordingly, the pixels belonging to the group for which there is a low probability of the presence of an edge are referred to more strongly even when the pixels are the pixels in the same prediction tap. The pixels belonging to the group for which there is a high probability of the presence of an edge are referred to more weakly. This is because the pixels of a portion of an edge in an image are considered to have low correlation with the peripheral pixels.

In the embodiment of the present technology, for example, by appropriately switching the weights of the pixels of the reference region without switching dedicated processes on an edge portion and a texture portion of an image, as in the related art, an appropriate image quality improvement process can be performed on the edge portion or the texture portion.

In the embodiment of the present technology, for example, the image quality improvement process can be performed on the entire image without prominence in a process boundary between a dedicated edge process and a dedicated texture process.

In the embodiment of the present technology, the sharpness of an edge can be realized while suppressing deterioration such as ringing. Further, an improvement in the sharpness of a texture can be simultaneously realized. Compared to the related art, for example, the ringing can be suppressed even when the sharpness is strongly improved.

In the embodiment of the present technology, since the regression coefficient used for the image quality improvement process is learned for each class code indicating the feature amount of the class tap in consideration of the weight, the image quality improvement process can be performed according to not only the edge or the texture but also various characteristics.

In the embodiment of the present technology, the image quality improvement process can be performed on various images including an edge or a texture without occurrence of deterioration.

Next, an example of a learning process performed by the learning device 10 in FIG. 1 will be described with reference to the flowchart of FIG. 5.

In step S21, the class sorting unit 21 extracts the class tap constituted by the plurality of pixel values of the student image corresponding to the pixel of interest of the teacher image.

In step S22, the class sorting unit 21 sorts the class tap into the class based on the feature amount of the class tap extracted in step S21. At this time, for example, the class tap is sorted into the class according to the method described above with reference to FIG. 2.

In step S23, the weight calculation unit 22 extracts the prediction tap from the plurality of pixel values of the student image corresponding to the pixel of interest of the teacher image.

In step S24, the weight calculation unit 22 sorts the pixel values constituting the prediction tap into the plurality of groups. At this time, as described above with reference to FIG. 3, for example, the pixel values constituting the prediction tap are sorted into the plurality of groups.

In step S25, the weight calculation unit 22 calculates the feature amount for each group sorted in the process of step S24. Here, the feature amount is set as a feature amount having high correlation with presence of an edge. For example, a feature amount such as a dynamic range or an activity is calculated as the feature amount having the high correlation with the presence of the edge.

In step S26, the weight calculation unit 22 calculates the weight corresponding to each pixel value in the prediction tap based on the feature amount calculated in step S25. At this time, for example, as described above, the weight vij by which each of the pixel values in the prediction tap is multiplied is calculated.

In step S27, the regression coefficient learning unit 23 generates the samples of the linear equation used to calculate the pixel values of the teacher images based on the pixel values of the student image, using the weights vij calculated in the above-described way.

In step S28, the regression coefficient learning unit 23 adds the samples generated in the process of step S27 for each class code.

In step S29, it is determined whether the addition corresponding to all the samples ends. That is, it is determined whether the processes of step S21 to step S28 are performed with all of the pixels of the teacher image set as the pixel of interest.

When it is determined in step S29 that the addition corresponding to all the samples does not end, the process returns to step S21 and the subsequent processes are repeatedly performed.

When it is determined in step S29 that the addition corresponding to all the samples ends, the process proceeds to step S30.

In step S30, the regression coefficient learning unit 23 calculates the regression coefficient for each class code. At this time, for example, the regression coefficient wcj is obtained by the least-square method based on the samples of the linear equation added in the above-described way so that the minimization function Q calculated by Expression (5) is the minimum. The regression coefficient obtained here is stored in the regression coefficient memory 24 in correspondence with the class code.

In this way, the learning process is performed.

Figure 6:
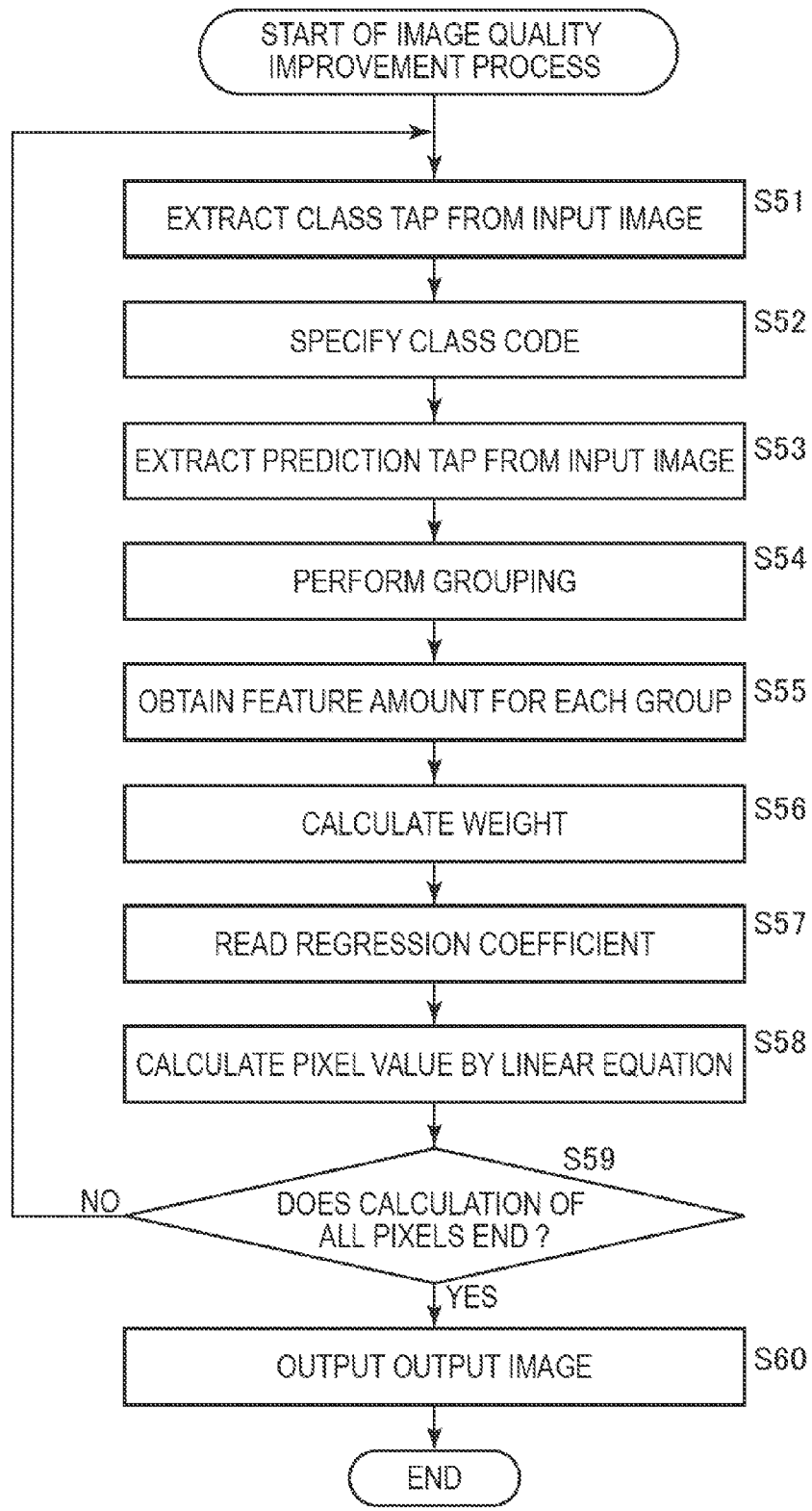
FIG. 6 is a flowchart illustrating an example of an image quality improvement process.

Next, an example of the image quality improvement process performed by the image processing device 100 in FIG. 4 will be described with reference to the flowchart of FIG. 6.

Figure 5:
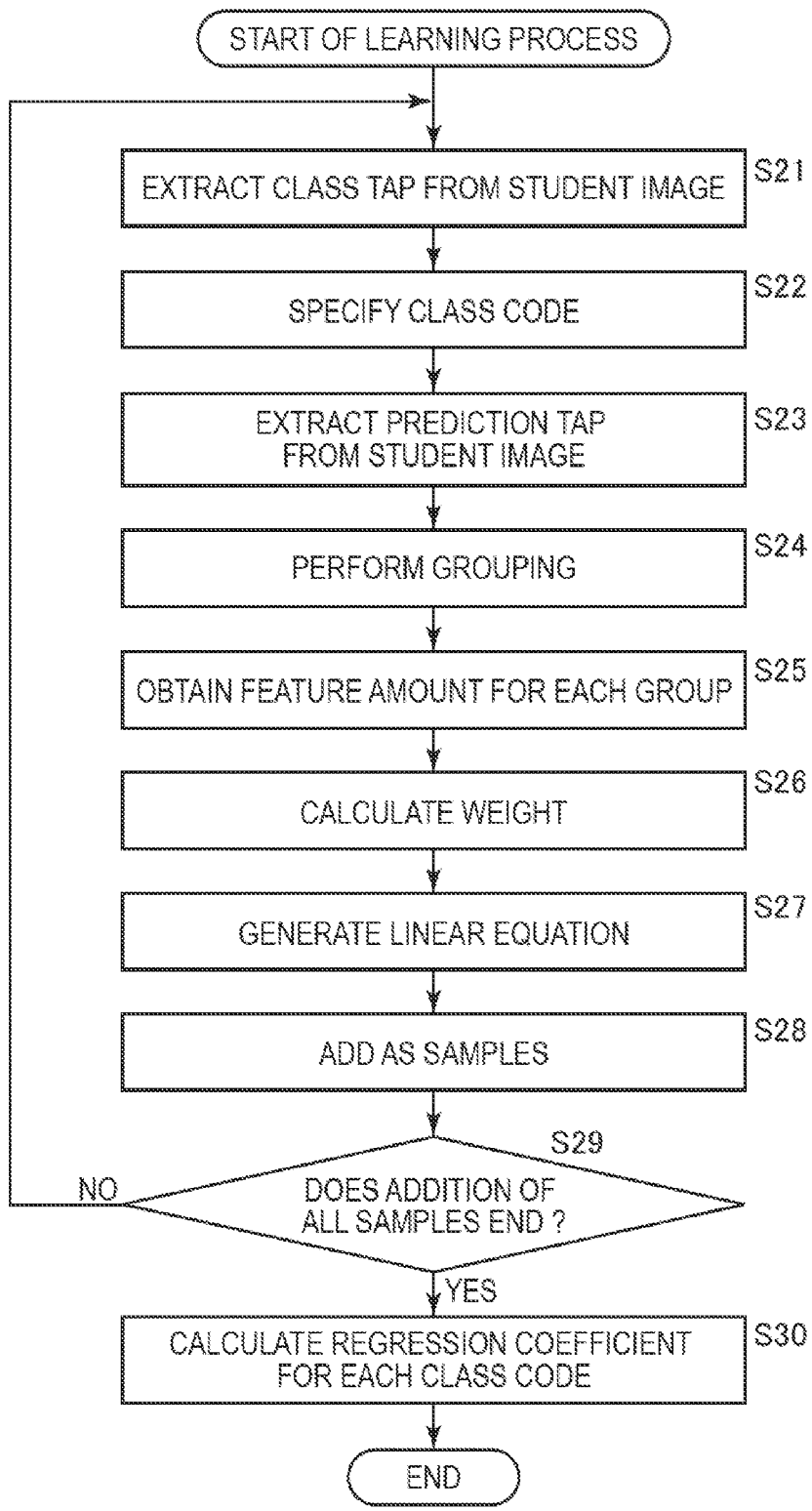
FIG. 5 is a flowchart illustrating an example of a learning process.

Before the process is performed, the regression coefficients calculated in the process of step S30 in FIG. 5 are assumed to be stored in the regression coefficient memory 124.

In step S51, the class sorting unit 121 extracts the class tap constituted by the plurality of pixel values corresponding to the pixel of interest of the input image.

In step S52, the class sorting unit 121 specifies the class code of the class tap based on the feature amount of the class tap extracted in the process of step S51. The class sorting unit 121 of the image processing device 100 specifies the class code in step S52 according to the same method as that of the class sorting unit 21 of the learning device 10 in step S22. For example, as described above with reference to FIG. 2, the class is sorted and the class code corresponding to the extracted class tap is specified.

In step S53, the weight calculation unit 122 extracts the prediction tap constituted by the plurality of pixel values corresponding to the pixel of interest of the input image.

In step S54, the weight calculation unit 122 sorts the pixel values constituting the prediction tap into the plurality of groups. At this time, for example, as described above with reference to FIG. 3, the pixel values constituting the prediction tap are sorted into the plurality of groups.

In step S55, the weight calculation unit 122 calculates the feature amount for each group sorted in the process of step S54. Here, the feature amount is set as a feature amount having high correlation with presence of an edge. For example, a feature amount such as a dynamic range or an activity is calculated as the feature amount having the high correlation with the presence of the edge.

In step S56, the weight calculation unit 122 calculates the weight corresponding to each pixel value in the prediction tap based on the feature amount calculated in step S55. At this time, for example, as described above, the weight vij by which each of the pixel values in the prediction tap is multiplied is calculated.

In step S57, the prediction calculation unit 123 reads the regression coefficient wcj corresponding to the class code c specified by the class sorting unit 121 from the regression coefficient memory 124.

In step S58, the prediction calculation unit 123 calculates the pixel value by the linear equation using the weight vij obtained in the process of step S56 and the regression coefficient wcj read in the process of step S57. At this time, for example, each of the pixel values constituting the prediction tap is multiplied by the weight vij and each of the pixel values constituting the prediction tap is multiplied by the regression coefficient wcj. That is, the pixel value is obtained by the linear equation expressed by Expression (6).

In step S59, it is determined whether calculation of the pixel values corresponding to all of the pixels of the output image ends.

When it is determined in step S59 that the calculation of the pixel values corresponding to all of the pixels of the output image does not end, the process returns to step S51 and the subsequent processes are repeatedly performed.

When it is determined in step S59 that the calculation of the pixel values corresponding to all of the pixels of the output image ends, the process proceeds to step S60.

In step S60, the image processing device 100 outputs the output image.

In this way, the image quality improvement process is performed.

The above-described series of processes can be executed by hardware or software. When the above-described series of processes is executed by the software, a program constituting the software is installed from a network or a recording medium to a computer built in dedicated hardware or a general-purpose personal computer 700, for example, which can execute various functions by installing various programs, or the like, as illustrated in FIG. 7.

Figure 7:
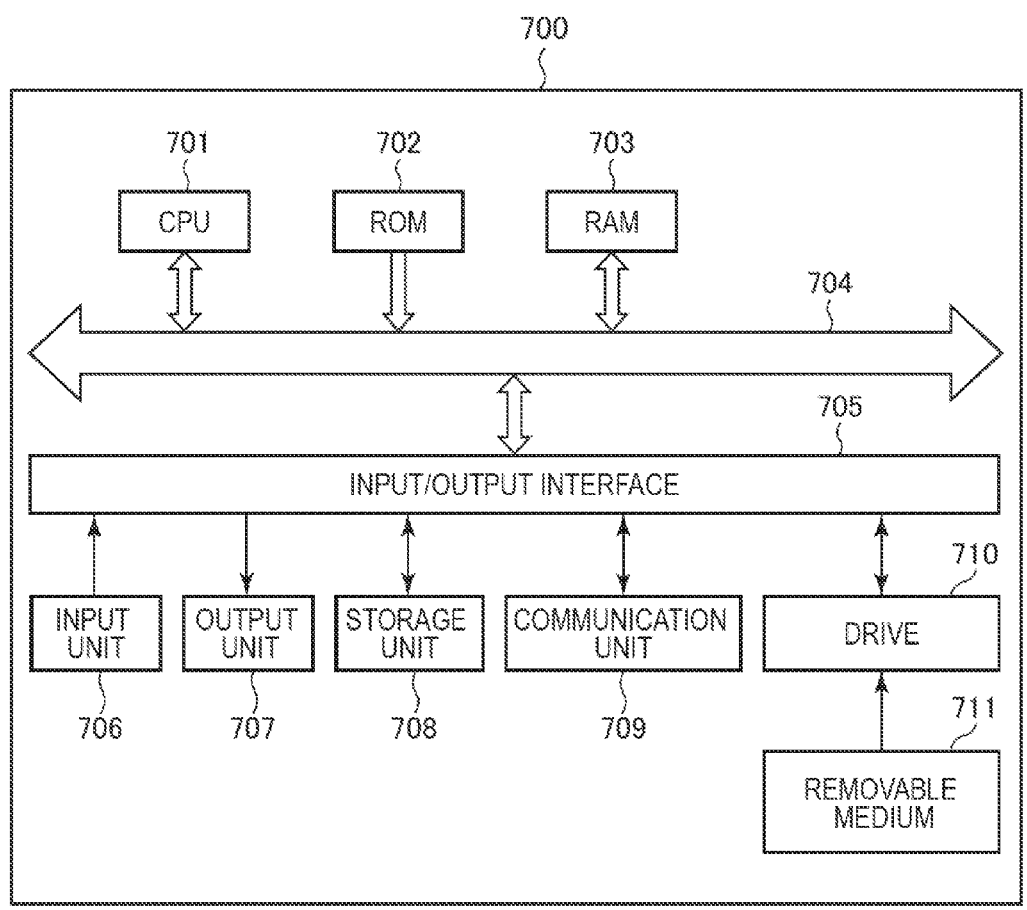
FIG. 7 is a block diagram illustrating an example of the configuration of a personal computer.

In FIG. 7, a central processing unit (CPU) 701 executes various processes according to a program stored in a read only memory (ROM) 702 or a program loaded from a storage unit 708 to a random access memory (RAM) 703. In addition, data or the like necessary for executing various processes by the CPU 701 is appropriately stored in the RAM 703.

The CPU 701, the ROM 702, and the RAM 703 are connected to each other via a bus 704. In addition, this bus 704 is also connected to an input/output (I/O) interface 705.

An input unit 706 including a keyboard, a mouse or the like, an output unit 707 including a display such as a liquid crystal display (LCD), a speaker or the like, a storage unit 708 including a hard disk or the like, and a communication unit 709 including a modem, a network interface card such as a local area network (LAN) card, or the like are connected to the I/O interface 705. The communication unit 709 performs a communication process through a network such as the Internet.

If necessary, a drive 710 is connected to the I/O interface 705, removable media 711 such as a magnetic disk, an optical disc, a magneto-optical disc or a semiconductor memory are appropriately mounted, and a computer program read therefrom is installed in the storage unit 708, if necessary.

If the above-described series of processes is executed by software, a program constituting the software is installed from a network such as the Internet or recording media including the removable media 711 and the like.

This recording medium includes, for example, as illustrated in FIG. 7, the removable media 711 including a magnetic disk (including a floppy disk (registered trademark), an optical disc (including a compact disc-read only memory (CD-ROM) or a digital versatile disc (DVD)), a magneto-optical disc (mini disc (MD) (registered trademark)), a semiconductor memory, or the like recording a program distributed to be delivered to a user, separately from a device body. Also, the recording medium includes the ROM 702 recording a program to be delivered to a user in a state in which it is built in the device body in advance, or a hard disk included in the storage unit 708.

The series of processes described in this specification includes processes to be executed in time series in the described order and processes to be executed in parallel or individually, not necessarily in time series.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:

a weight calculation unit that calculates a weight corresponding to each of a plurality of pixel values centering on a pixel of interest of an input image based on a feature amount calculated based on the plurality of pixel values centering on the pixel of interest;

a regression coefficient reading unit that reads a regression coefficient stored for each class code determined based on a plurality of pixel values corresponding to the pixel of interest of the input image; and a pixel value calculation unit that calculates a pixel value of a pixel of interest of an output image by performing calculation using the plurality of pixel values, the weights, and the regression coefficients centering on the pixel of interest of the input image.

(2) The image processing device according to (1), wherein the weight calculation unit calculates a feature amount having high correlation with presence of an edge based on the pixel values belonging to a group.

(3) The image processing device according to (1) or (2), further including:

a group sorting unit that sorts the plurality of pixel values centering on the pixel of interest of the input image into a plurality of groups, wherein the weight calculation unit calculates a weight corresponding to each of the plurality of pixel values centering on the pixel of interest, based on the feature amount calculated for each group based on the pixel values belonging to the group.

(4) The image processing device according to (3), wherein the weight calculation unit sorts a first number of pixel values centering on the pixel of interest into a plurality of groups which are constituted by pixels at a plurality of positions including at least a pixel position of the pixel of interest and are constituted by a second number of pixel values, the second number being smaller than the first number.

(5) The image processing device according to any one of (1) to (4), wherein the regression coefficient is learned and stored in advance, wherein, in the learning, a high-quality image is set as a teacher image and an image obtained by deteriorating the teacher image is set as a student image, and wherein a plurality of samples of a linear equation used to calculate a pixel value of a pixel of interest of the teacher image using a pixel value of the student image and the weights are generated for each class code, and the optimum regression coefficient is calculated from the plurality of samples.

(6) An image processing method including:

calculating, by a weight calculation unit, a weight corresponding to each of a plurality of pixel values centering on a pixel of interest of an input image based on a feature amount calculated based on the plurality of pixel values centering on the pixel of interest;

reading, by a regression coefficient reading unit, a regression coefficient stored for each class code determined based on a plurality of pixel values corresponding to the pixel of interest of the input image; and calculating, by a pixel value calculation unit, a pixel value of a pixel of interest of an output image through calculation of a linear equation using the plurality of pixel values, the weights, and the regression coefficients centering on the pixel of interest of the input image.

(7) A program for causing a computer to function as an image processing device including:

a weight calculation unit that calculates a weight corresponding to each of a plurality of pixel values centering on a pixel of interest of an input image based on a feature amount calculated based on the plurality of pixel values centering on the pixel of interest;

a regression coefficient reading unit that reads a regression coefficient stored for each class code determined based on a plurality of pixel values corresponding to the pixel of interest of the input image; and a pixel value calculation unit that calculates a pixel value of a pixel of interest of an output image by performing calculation using the plurality of pixel values, the weights, and the regression coefficients centering on the pixel of interest of the input image.

(8) A learning device that sets a high-quality image as a teacher image and sets an image obtained by deteriorating the teacher image as a student image, the device including:

a weight calculation unit that calculates a weight corresponding to each of a plurality of pixel values of the student image based on a feature amount calculated based on the plurality of pixel values of the student image corresponding to a pixel of interest of the teacher image; and a regression coefficient calculation unit that calculates a regression coefficient of regression prediction calculation performed to calculate a pixel value of the pixel of interest of the teacher image through calculation of a linear equation using the plurality of pixel values, the weights, and the regression coefficients of the student image.

(9) The learning device according to (8), wherein the weight calculation unit calculates a feature amount having high correlation with presence of an edge based on the pixel values belonging to a group.

(10) The learning device according to (8) or (9), further including:

a group sorting unit that sorts the plurality of pixel values of the student image corresponding to the pixel of interest of the teacher image into a plurality of groups, wherein the weight calculation unit calculates a weight corresponding to each of the plurality of pixel values of the student image, based on a feature amount calculated for each group based on the pixel values belonging to the group.

(11) The learning device according to (10), wherein the weight calculation unit sorts a first number of pixel values centering on the pixel of interest into a plurality of groups which are constituted by pixels at a plurality of positions including at least a pixel position of the pixel of interest and are constituted by a second number of pixel values, the second number being smaller than the first number.

(12) A learning method of that sets a high-quality image as a teacher image and sets an image obtained by deteriorating the teacher image as a student image, the method including:

calculating, by a weight calculation unit, a weight corresponding to each of a plurality of pixel values of the student image based on a feature amount calculated based on the plurality of pixel values of the student image corresponding to a pixel of interest of the teacher image; and calculating, by a regression coefficient calculation unit, a regression coefficient of regression prediction calculation performed to calculate a pixel value of the pixel of interest of the teacher image through calculation of a linear equation using the plurality of pixel values, the weights, and the regression coefficients of the student image.

(13) A program causing a computer to function as a learning device that sets a high-quality image as a teacher image and sets an image obtained by deteriorating the teacher image as a student image, the learning device including:

a weight calculation unit that calculates a weight corresponding to each of a plurality of pixel values of the student image based on a feature amount calculated based on the plurality of pixel values of the student image corresponding to a pixel of interest of the teacher image; and a regression coefficient calculation unit that calculates a regression coefficient of regression prediction calculation performed to calculate a pixel value of the pixel of interest of the teacher image through calculation of a linear equation using the plurality of pixel values, the weights, and the regression coefficients of the student image.

What is claimed is:

1. An image processing device comprising:
   a weight calculation unit that calculates a weight corresponding to each of a plurality of pixel values centering on a pixel of interest of an input image based on a feature amount calculated based on the plurality of pixel values centering on the pixel of interest;

a regression coefficient reading unit that reads a regression coefficient stored for each class code determined based on a plurality of pixel values corresponding to the pixel of interest of the input image; and a pixel value calculation unit that calculates a pixel value of a pixel of interest of an output image by performing calculation using the plurality of pixel values, the weights, and the regression coefficients centering on the pixel of interest of the input image, wherein the regression coefficient is learned and stored in advance, wherein, in the learning, a high-quality image is set as a teacher image and an image obtained by deteriorating the teacher image is set as a student image, and wherein a plurality of samples of a linear equation used to calculate a pixel value of a pixel of interest of the teacher image using a pixel value of the student image and the weights are generated for each class code, and the optimum regression coefficient is calculated from the plurality of samples.

2. The image processing device according to claim 1, wherein the weight calculation unit calculates a feature amount having high correlation with presence of an edge based on the pixel values belonging to a group.

3. The image processing device according to claim 1, further comprising:

a group sorting unit that sorts the plurality of pixel values centering on the pixel of interest of the input image into a plurality of groups, wherein the weight calculation unit calculates a weight corresponding to each of the plurality of pixel values centering on the pixel of interest, based on the feature amount calculated for each group based on the pixel values belonging to the group.

4. The image processing device according to claim 3, wherein the weight calculation unit sorts a first number of pixel values centering on the pixel of interest into a plurality of groups which are constituted by pixels at a plurality of positions including at least a pixel position of the pixel of interest and are constituted by a second number of pixel values, the second number being smaller than the first number.

5. An image processing method comprising:

calculating, by a weight calculation unit, a weight corresponding to each of a plurality of pixel values centering on a pixel of interest of an input image based on a feature amount calculated based on the plurality of pixel values centering on the pixel of interest;

reading, by a regression coefficient reading unit, a regression coefficient stored for each class code determined based on a plurality of pixel values corresponding to the pixel of interest of the input image; and calculating, by a pixel value calculation unit, a pixel value of a pixel of interest of an output image through calculation of a linear equation using the plurality of pixel values, the weights, and the regression coefficients centering on the pixel of interest of the input image, wherein at least one of the weight calculation unit, the regression coefficient reading unit, and the pixel value calculation unit are configured as hardware, wherein the regression coefficient is learned and stored in advance, wherein, in the learning, a high-quality image is set as a teacher image and an image obtained by deteriorating the teacher image is set as a student image, and wherein a plurality of samples of a linear equation used to calculate a pixel value of a pixel of interest of the teacher image using a pixel value of the student image and the weights are generated for each class code, and the optimum regression coefficient is calculated from the plurality of samples.

6. A non-transitory computer readable medium having stored thereon a program for causing a computer to function as an image processing device including:

a weight calculation unit that calculates a weight corresponding to each of a plurality of pixel values centering on a pixel of interest of an input image based on a feature amount calculated based on the plurality of pixel values centering on the pixel of interest;

a regression coefficient reading unit that reads a regression coefficient stored for each class code determined based on a plurality of pixel values corresponding to the pixel of interest of the input image; and a pixel value calculation unit that calculates a pixel value of a pixel of interest of an output image by performing calculation using the plurality of pixel values, the weights, and the regression coefficients centering on the pixel of interest of the input image, wherein the regression coefficient is learned and stored in advance, wherein, in the learning, a high-quality image is set as a teacher image and an image obtained by deteriorating the teacher image is set as a student image, and wherein a plurality of samples of a linear equation used to calculate a pixel value of a pixel of interest of the teacher image using a pixel value of the student image and the weights are generated for each class code, and the optimum regression coefficient is calculated from the plurality of samples.

* * * * *